US008379494B2

(12) United States Patent
Peng et al.

(10) Patent No.: US 8,379,494 B2
(45) Date of Patent: Feb. 19, 2013

(54) LASER-IN SLIDER LIGHT DELIVERY FOR HEAT ASSISTED MAGNETIC RECORDING

(75) Inventors: Chubing Peng, Minnetonka, MN (US); Yongjun Zhao, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/020,253

(22) Filed: Feb. 3, 2011

(65) Prior Publication Data
US 2012/0201107 A1 Aug. 9, 2012

(51) Int. Cl.
*G11B 11/00* (2006.01)
(52) U.S. Cl. ...................................... 369/13.01
(58) Field of Classification Search .................. None
See application file for complete search history.

(56) References Cited

U.S. PATENT DOCUMENTS

| | | | |
|---|---|---|---|
| 5,140,569 A | 8/1992 | Nebashi | |
| 6,741,526 B1 | 5/2004 | Fujiie et al. | |
| 6,807,131 B1 | 10/2004 | Hesselink et al. | |
| 2002/0122376 A1* | 9/2002 | Song | 369/112.27 |
| 2004/0160887 A1* | 8/2004 | Ma et al. | 369/112.29 |
| 2005/0117856 A1* | 6/2005 | Huang et al. | 385/96 |
| 2006/0188196 A1* | 8/2006 | Charters et al. | 385/33 |
| 2008/0056073 A1* | 3/2008 | Shimizu | 369/13.02 |
| 2008/0107377 A1 | 5/2008 | Cho et al. | |
| 2008/0232225 A1 | 9/2008 | Cho et al. | |
| 2008/0278460 A1* | 11/2008 | Arnett et al. | 345/175 |
| 2009/0154872 A1* | 6/2009 | Sherrer et al. | 385/14 |
| 2009/0266789 A1 | 10/2009 | Shimazawa et al. | |

* cited by examiner

*Primary Examiner* — Joseph Feild
*Assistant Examiner* — Henok Heyi
(74) *Attorney, Agent, or Firm* — Hollingsworth Davis, LLC

(57) ABSTRACT

An apparatus includes a light source for producing a beam of light, a coupler for coupling the light into a slider waveguide, a beam expander for expanding the beam of light from the waveguide to produce an expanded beam, a collimator for collimating the expanded beam, and a focusing device for concentrating the collimated beam to a focal point. A method of delivering light to a focal point is also described.

18 Claims, 5 Drawing Sheets

LASER-IN SLIDER LIGHT DELIVERY FOR HEAT ASSISTED MAGNETIC RECORDING

BACKGROUND

Heat assisted magnetic recording (HAMR) generally refers to the concept of locally heating a recording media to reduce the coercivity of the media so that an applied magnetic writing field can more easily direct the magnetization of the media during the temporary magnetic softening of the media caused by the heat source. The heated area in the storage layer determines the data bit dimension. A tightly confined, high power laser light spot is used to heat a portion of the recording media to substantially reduce the coercivity of the heated portion. Then the heated portion is subjected to a magnetic field that sets the direction of magnetization of the heated portion. In this manner the coercivity of the media at ambient temperature can be much higher than the coercivity during recording, thereby enabling stability of the recorded bits at much higher storage densities and with much smaller bit cells.

One way to achieve a small confined hot spot is to use an optical near-field transducer (NFT), such as a plasmonic optical antenna or a metallic aperture, integrated in an optical waveguide of high refractive index contrast. Light propagating in the waveguide is focused by an optical focusing element, such as a planar solid immersion mirror onto the near-field transducer. One example uses a planar solid immersion mirror (PSIM), or lens, fabricated in a planar waveguide; and a near-field transducer in the form of an isolated metallic nanostructure, placed near the PSIM focus. The near-field transducer is designed to reach a local surface plasmon (LSP) condition at a designated light wavelength. At LSP, a high field surrounding the near-field transducer appears, due to collective oscillation of electrons in the metal. Part of the field will tunnel into an adjacent media and get absorbed, raising the temperature of the media locally for recording.

It is desirable to launch light into the waveguide with a low cost apparatus, having good alignment tolerances and high light delivery efficiency.

SUMMARY

In a first aspect, the invention provides an apparatus including a light source for producing a beam of light, a coupler for coupling the light into a slider waveguide, a beam expander for expanding the beam of light, a collimator for collimating the expanded beam, and a focusing device for concentrating the collimated beam to a focal point.

In another aspect, the invention provides a method including: producing a beam of light, coupling the light into a slider waveguide, expanding the beam of light to produce an expanded beam, collimating the expanded beam, and concentrating the collimated beam to a focal point.

DETAILED DESCRIPTION OF THE INVENTION

Figure 1:
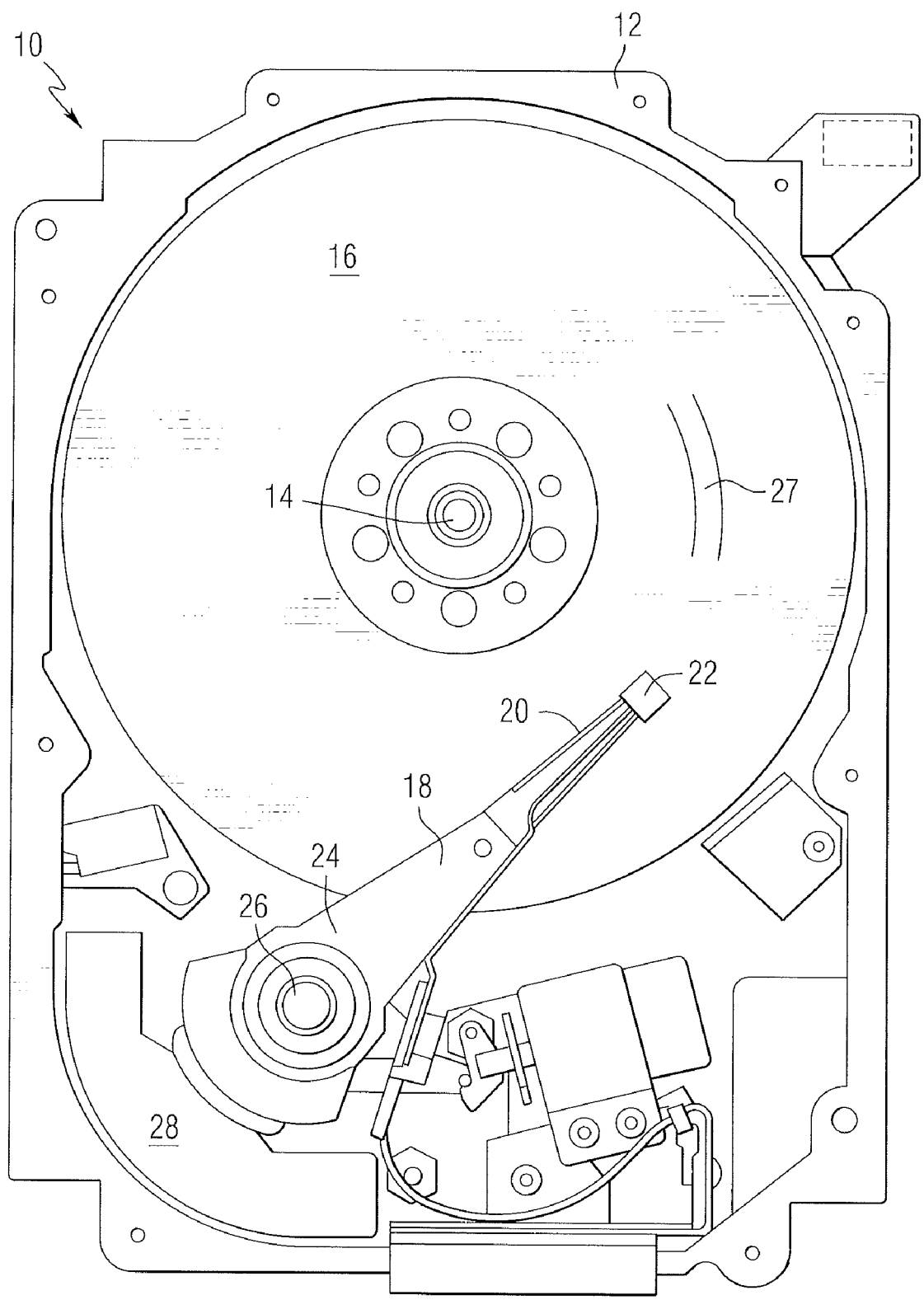
FIG. 1 is a pictorial representation of a data storage device in the form of a disc drive that can include a recording head in accordance with an aspect of this invention.

FIG. 1 is a pictorial representation of a data storage device in the form of a disc drive 10 that can utilize a recording head constructed in accordance with an aspect of the invention. The disc drive 10 includes a housing 12 (with the upper portion removed and the lower portion visible in this view) sized and configured to contain the various components of the disc drive. The disc drive 10 includes a spindle motor 14 for rotating at least one magnetic recording media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired track 27 of the disc 16. The actuator motor 28 is regulated by a controller, which is not shown in this view and is well-known in the art.

Recent designs of HAMR recording heads include a thin film waveguide on a slider to guide light to the storage medium for localized heating of the storage medium. One slider design includes a laser incorporated into the slider structure. A previously proposed laser-in-slider light delivery system included a channel waveguide, an off-axis parabolic collimator, mirrors for routing a light beam in the waveguide, and a solid immersion minor (SIM) for focusing the light to a diffraction-limited optical spot. In one aspect, the present invention eases constraints on the positioning tolerance of the off-axis parabolic collimator relative to the channel waveguide and reduces asymmetry in the beam intensity profile after collimation.

Figure 2:
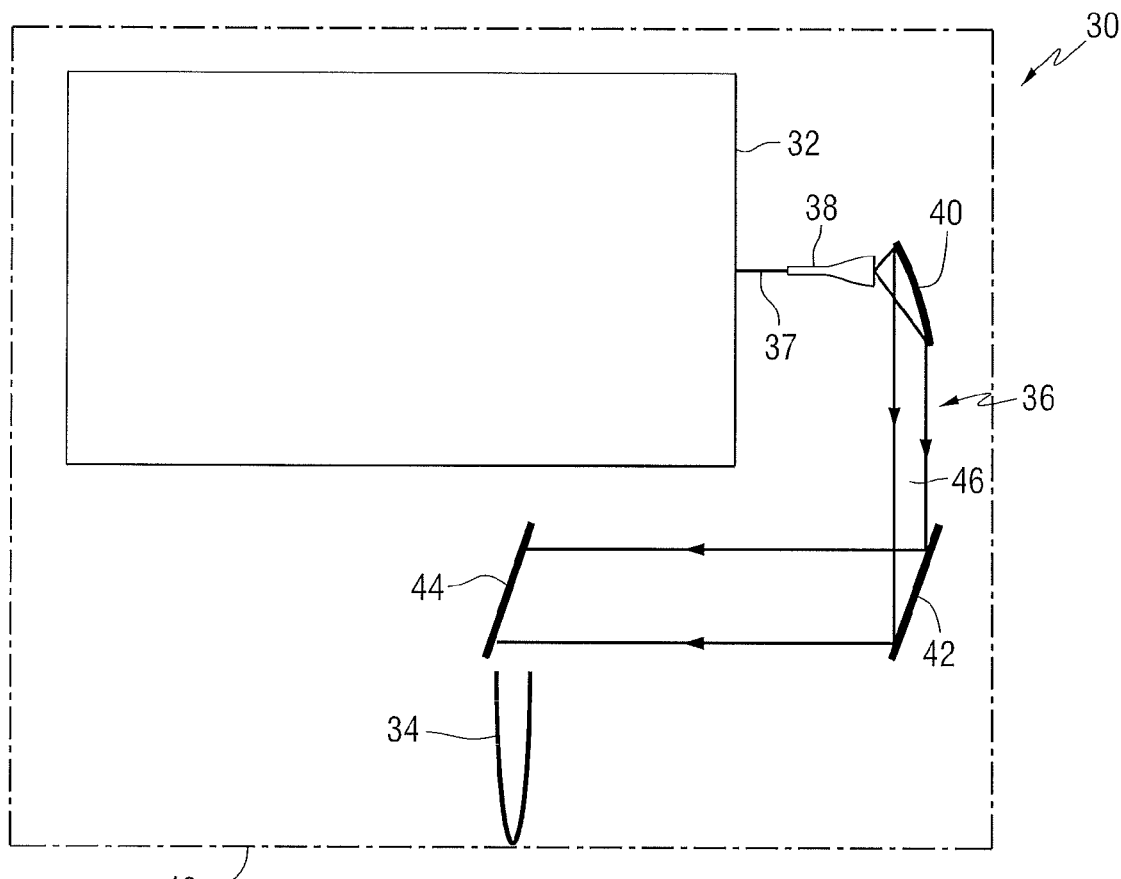
FIG. 2 is a schematic representation of portions of a recording head.

FIG. 2 is a schematic representation of elements in a portion of a recording head constructed in accordance with an embodiment. The recording head 30 includes a laser diode 32, a solid immersion mirror (SIM) 34, and a light delivery system 36 that delivers light from the laser diode to the solid immersion mirror that focuses the light to a focal point adjacent to an air bearing surface 48. The light delivery system includes a tapered waveguide coupler 37 and a waveguide beam expander 38, a parabolic collimator 40, a first mirror 42, and a second mirror 44. Light produced by the laser diode is coupled into the slider waveguide by the input coupler and expanded by the beam expander and collimated into a beam 46 by the parabolic collimator. The beam 46 is reflected by the first minor and then by the second mirror, which directs the beam onto the solid immersion minor. The first and second minors can be straight or spherical minors. Light propagates into the SIM naturally and it does not need a coupler. Note that light normal to the figure plane is guided/confined by a waveguide.

Figure 3:
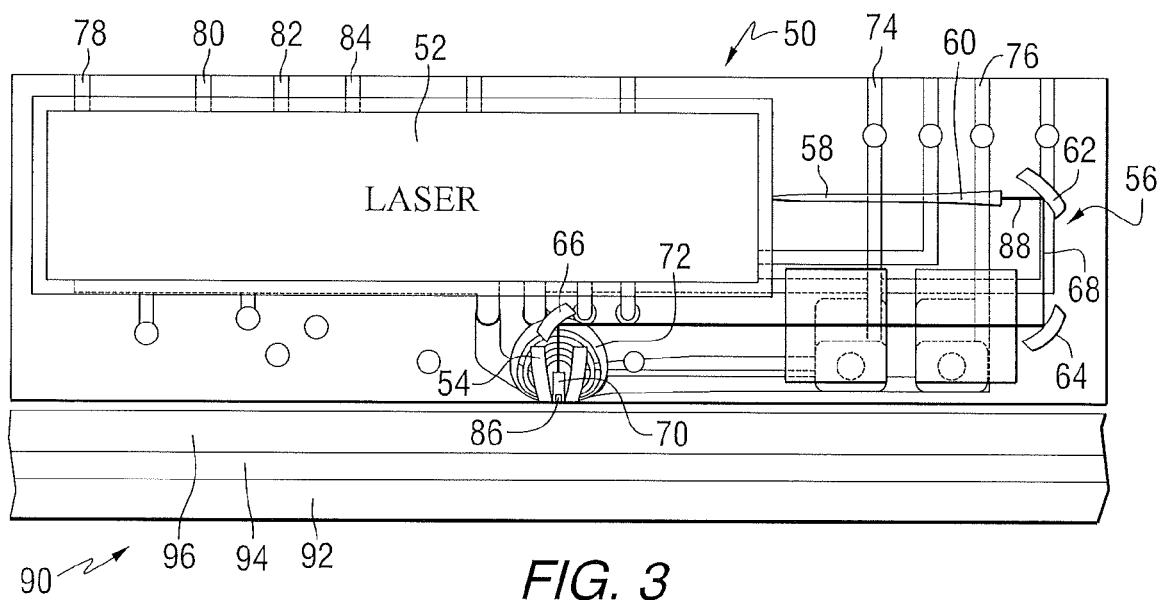
FIG. 3 is an elevation view of a recording head.

FIG. 3 is an elevation view of a recording head 50 that includes a light delivery system similar to that of FIG. 2. The recording head 50 includes a laser diode 52, a solid immersion mirror 54 and a light delivery system 56 that delivers light from the laser diode to the solid immersion mirror. The light delivery system includes a tapered waveguide input coupler 58 and a waveguide beam expander 60, parabolic collimator 62, a first minor 64 and a second mirror 66. The input coupler couples light from the laser diode into the slider waveguide. The beam expander is defined in Eq. (1) below.

Light is confined in a direct perpendicular to the plane of the figure by a planar/channel waveguide, which can be made of a dielectric material of high index of refraction as a waveguide core such as $Ta_2O_5$, $SiN_x$, ZnS, $SiO_xN_y$, Si, SiC, cladded by one or two dielectric materials of low index of refraction such as $Al_2O_3$, $SiO_2$, $SiO_xN_y$.

Light produced by the laser diode is coupled into the slider waveguide by a tapered waveguide coupler, expanded by the beam expander, and collimated into a beam 68 by the parabolic collimator 62. The beam 68 is reflected by the first mirror 64 of elliptic shape and then by the second mirror 66 of parabolic shape, which directs the beam onto the solid immersion focusing mirror 54. The first and second mirrors can be straight or spherical mirrors.

The recording head of FIG. 3 also includes a magnetic write pole 70 and a coil 72 for producing a magnetic field in the write pole. Electrical connections 74 and 76 are provided to supply power to the coil. Additional electrical connections, for example 78, 80, 82 and 84, are provided to supply power to the laser and other components of the head, that are not shown in this view, but are well known in the art, such as a read element. A near field transducer (NFT) 86 can be positioned adjacent to the air bearing surface 88 of the recording head. In this example, the laser 52 produces a light beam that passes through the input channel waveguide 58 and the beam expander 60 to produce an expanded beam 88. The expanded beam is culminated by a parabolic collimator 62. The collimated beam 68 is reflected by the first minor 64 and the second mirror 66, and directed onto the solid immersion minor 54 that focuses the light onto the near field transducer 86.

A recording medium 90 is positioned adjacent to or under the air bearing surface of the recording head 50. The recording medium 90 in this example includes a substrate 92, a soft magnetic underlayer 94 on the substrate 92, and a hard magnetic recording layer 96 on the soft underlayer.

Although the recording head may be a perpendicular magnetic recording head and the storage medium may be a perpendicular magnetic recording medium, it will be appreciated that the invention may also be used in conjunction with other types of recording heads and/or recording mediums where it may be desirable to employ heat assisted recording.

FIGS. 2 and 3 show light delivery systems that fit a previously known magnetic slider format. Light exiting from a laser diode chip is coupled into a waveguide with a signal-mode tapered channel waveguide, expanded by a waveguide beam expander, collimated by a parabolic minor, routed by two minors, and focused by a solid immersion mirror.

In one example, the slider size is 770 μm×230 μm, and the laser dimension is 500 μm×120 μm. The laser is flipped upside down and sits in a cavity that is 10 μm wider on each side than the laser. The cavity is 15 μm away from the slider edge. The laser active layer (e.g., the light emission layer) will be precisely aligned with the waveguide layer.

The waveguide and mirrors are in the middle part of the slider layer stacks. All the metal leads and pads can be interconnected below or above the waveguide and mirror layers through vias. With this light delivery layout there is still space for four final testing pads (e.g., electronic lapping guides, and reader or writer pads) at the end of the slider.

Figure 4:
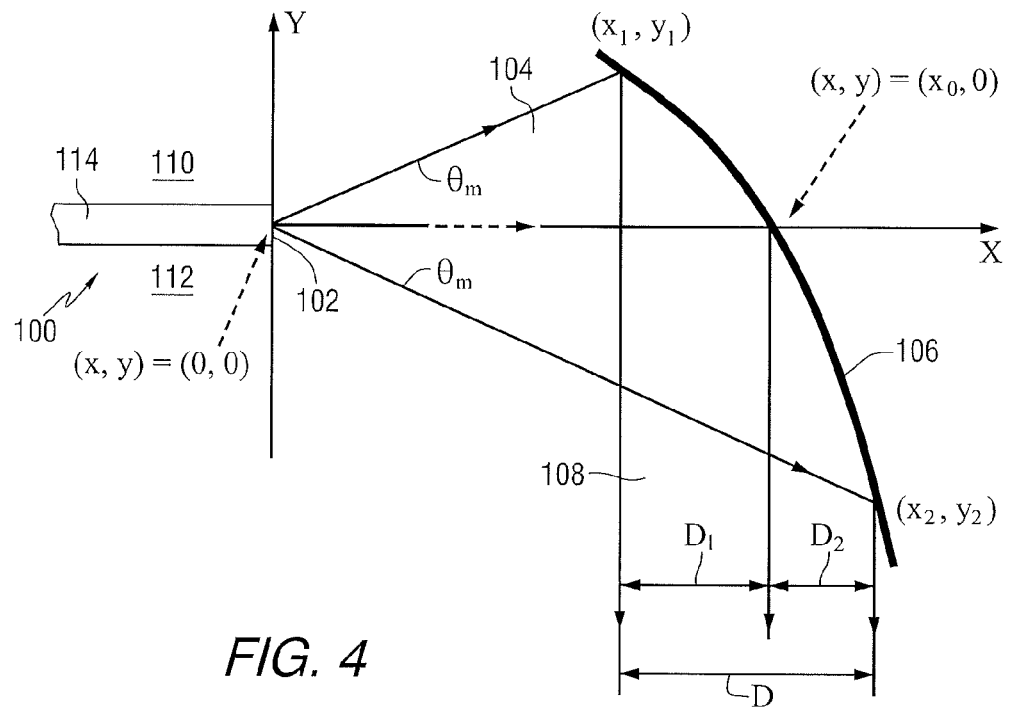
FIG. 4 is a schematic representation of a portion of a light delivery system.

FIG. 4 is a schematic representation of a beam collimation system. A laser beam passes through a channel or tapered channel waveguide 100. At the end 102 of the channel, the beam diverges. Light 104 exiting from a channel or a tapered channel waveguide is collimated by an off-axis parabolic mirror 106 to produce a collimated beam 108. The maximum light ray angle from the channel waveguide is $\theta_m$. As used herein, a tapered channel waveguide is a waveguide used for coupling the light from a laser diode to the slider waveguide. It has narrower width (in the Y direction) at the start (nearest to the diode) than the end 102.

One example waveguide uses $Al_2O_3$ as cladding layers 110, 112 positioned on opposite sides of a $Ta_2O_5$ core layer 114. In FIG. 4, all areas to the right of the channel waveguide are in a core layer of the planar waveguide. The index of refraction, n, of the $Al_2O_3$ is n=1.64 and that of $Ta_2O_5$ is n=2.10. Light wavelength in free space λ=830 nm. The beam asymmetry ($D_1 \neq D_2$), as well as the beam tilting resulting from positioning deviation of the collimator, depend on the maximum angle ($\theta_m$) of the optic rays exiting from the channel or tapered channel waveguide. Modeling of one example for the components on FIG. 4 shows that the width of a channel waveguide for single mode propagation is less than 700 nm, which yields 30°.

At $\theta_m=30°$ and beam size D=25 μm, the beam divergence after collimation due to the positioning deviation of the parabolic collimator along the x direction is −1.98°/μm and the beam azimuthal tilting from the y direction due to the positioning deviation along the y direction is 3.44°/μm. If the azimuthal tilting tolerance required is ±0.1°, the positioning tolerance along the y direction will be 30 nm, which is difficult to achieve in photolithography. The beam asymmetry $D_1/D_2$ is 1.73 at $\theta_m=30°$, which will increase the optical spot size condensed by a SIM. However, a small optical spot is desirable, since the heated area of the storage medium may determine the data bit dimensions.

Figure 5:
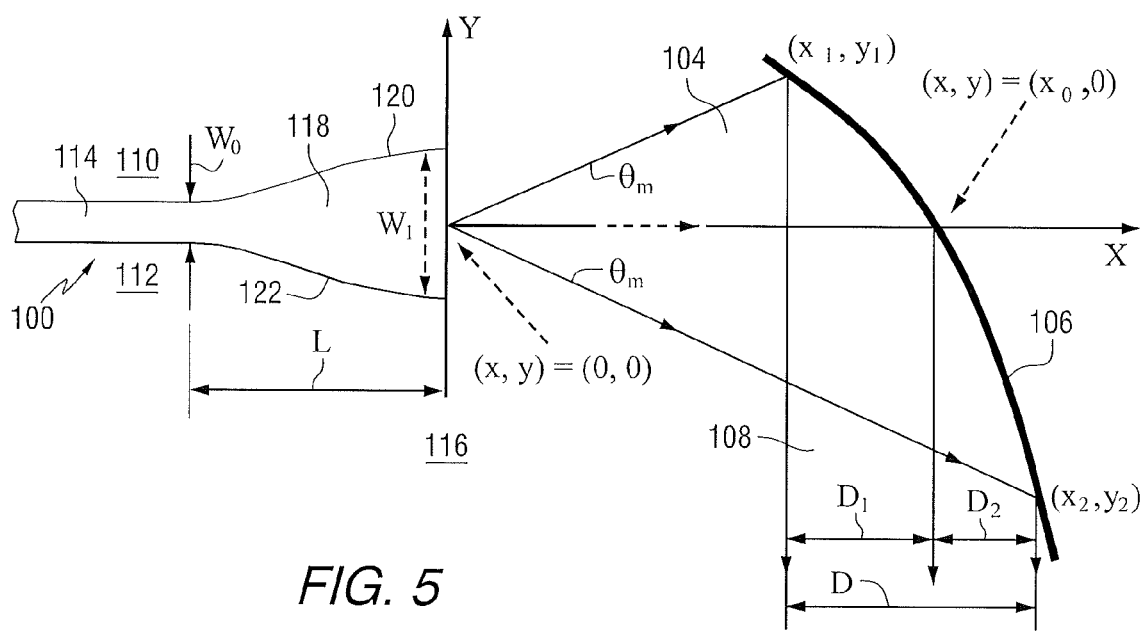
FIG. 5 is a schematic representation of a portion of another light delivery system.

In one aspect, this invention addresses the beam asymmetry by using a waveguide beam expander to reduce $\theta_m$ prior to collimation. FIG. 5 is a schematic representation of a collimation system 116 including many of the components of FIG. 4, with a beam expander 118. In FIG. 4, all areas to the right of the beam expander are in a core layer of the planar waveguide. The beam expander has a start width $W_0$, which is the same as the width of the channel or tapered channel waveguide 100, an end width $W_1$, and a length L. For beam expansion, $W_1 > W_0$.

In one example, the beam expander includes walls 120, 122 having a parabolic shape and its width W(x) increases with the distance d from the channel waveguide by $$W(x)^2 = W_0^2 + 2\alpha/\lambda_g d, \quad (1)$$

where $W_0$ is the start width of the beam expander, $\lambda_g$ is the mode wavelength of the waveguide, and α is a constant. To achieve single-mode operation, α<1. Assuming $W_0=0.6\lambda$, (λ denotes the light wavelength in free space.), $W_1=4\lambda$, $\lambda_g=\lambda/1.78$, and α=0.2, then L=70λ.

The materials used for the beam expander can be similar to those used for the channel waveguide, except that the core width along the y-direction increases.

The beam of light exiting from a single-mode channel or tapered channel waveguide is expanded by the waveguide beam expander, which decreases $\theta_m$ correspondingly, since the sin $\theta_m$ is proportional to $\lambda_g/W_1$.

If $\theta_m$ is reduced to be 5°, at a beam size of D=25 μm, the beam divergence after collimation due to the positioning deviation of the parabolic collimator along the x direction is −0.038°/μm and the beam azimuthal tilting from the y direction due to the positioning deviation along the y direction is 0.434°/μm. At 0.1° azimuthal tilting, the positioning tolerance along the y direction reaches 230 nm, which is well below the fabrication tolerances of current photolithography. The beam ratio $D_1/D_2$ is 1.09.

Figure 6:
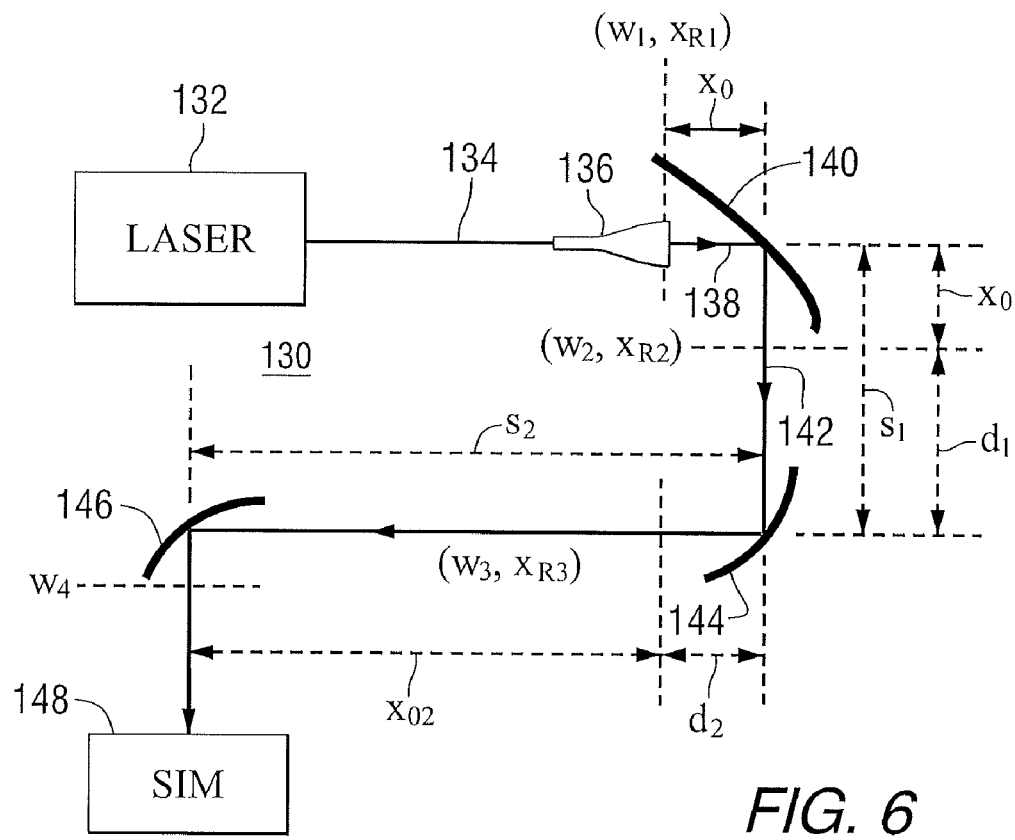
FIG. 6 is a schematic representation of another light delivery system.

FIG. 6 is a schematic representation of a light delivery system 130 that illustrates the design parameters. The system includes a laser 132 that produces a light beam in a channel waveguide 134. A beam expander 136 is positioned at the end of the channel waveguide and produces an expanded beam 138. The expanded beam is collimated by a first parabolic collimator 140 to produce a collimated beam 142 that is reflected by an elliptical minor 144 and a second parabolic collimator 146 and directed onto a solid immersion minor 148.

The beam 138 exiting from a beam expander 136 can be well described by a fundamental Gaussian beam of beam radius $w_1$ at the $1/e^2$ intensity point and Rayleigh length, $$x_{R1} = \frac{\pi w_1^2}{\lambda_g}. \tag{1}$$

The exit facet of the beam expander is positioned at the focus of the first parabolic collimator. The distance $x_0$ determines the shape of first parabolic collimator:

$$y = \frac{x_0^2 - x^2}{2x_0} \tag{2}$$

After reflection from the first parabolic collimator, the beam waist is located at a distance $x_0$ from the collimator. The distance $x_0$ is determined by the desired beam radius $w_2$ after the collimation or the slider space available, where:

$$x_0 = \frac{w_2}{w_1} x_{R1} = \frac{\pi w_1 w_2}{\lambda_g}. \tag{3}$$

The collimated beam propagates from the first parabolic collimator to an elliptic mirror 144. Assuming that the distance between the first parabolic collimator and the elliptic mirror is $s_1$, and that the beam waist after reflection from the elliptic mirror is at a distance $d_2$ from the elliptic mirror, the equivalent focal length of the elliptic mirror is determined by:

$$f = \frac{(2d_1 d_2 + d_1^2 + x_{R2}^2) - \sqrt{(2d_1 d_2 + d_1^2 + x_{R2}^2)^2 - 4(d_1 + d_2)d_2(d_1^2 + x_{R2}^2)}}{2(d_1 + d_2)}, \tag{4}$$

where $$d_1 = s_1 - x_0, \tag{5a}$$

$$d_2 \leq \frac{d_1^2 + x_{R1}^2}{2x_{R1}}, \text{ and} \tag{5b}$$

$$x_{R2} = \frac{\pi w_2^2}{\lambda_g}. \tag{5c}$$

The beam radius $w_3$ after the elliptic minor and at the beam waist is given by:

$$w_3 = w_2 \sqrt{\frac{d_2 - f}{d_1 - f}}. \tag{6a}$$

The Rayleigh length at this waist is given by $$x_{R3} = \frac{\pi w_3^2}{\lambda_g}. \tag{6b}$$

The elliptic minor shape is determined by the two parameters $(d_3, d_4)$:

$$f = \frac{d_3 d_4}{(d_3 + d_4)}, \tag{7}$$

where $d_3$ is the distance of one of foci of the elliptic mirror from the minor and $d_4$ is the distance of the second focus from the mirror. The distance $d_3$ may be determined from the radius of curvature of the incident wave on the elliptic minor, $$d_3 = d_1 \left[1 + \left(\frac{x_{R2}}{d_1}\right)^2\right]. \tag{8a}$$

Once $d_3$ is determined, $d_4$ is determined from for a given f:

$$d_4 = \frac{f}{d_3 - f} d_3. \tag{8b}$$

Figure 7:
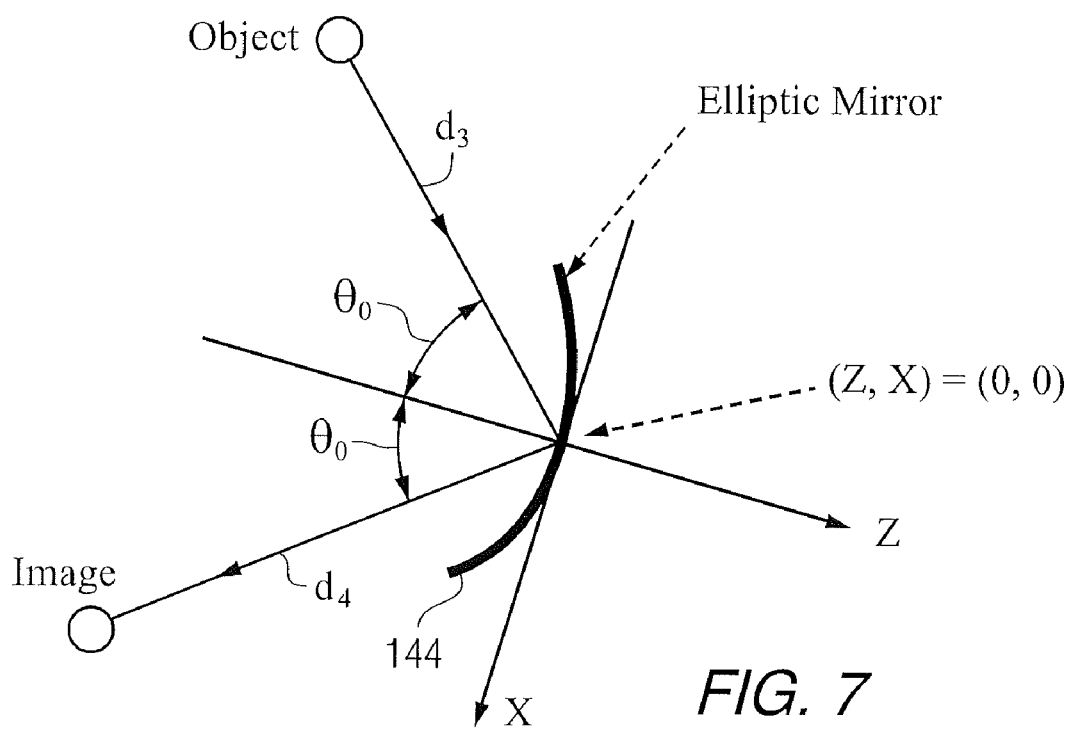
FIG. 7 is a schematic representation of an elliptical mirror.

FIG. 7 shows an elliptic mirror for imaging an object point located at distance $d_3$ to a point at distance $d_4$ for $\theta_0 = \pi/4$. In the local coordinate system shown in FIG. 7, the shape of the elliptic minor 144 is given by:

$$Z^2[(d_3^2 + d_4^2)\sin^2\theta_0 + 2d_3 d_4(1 + \cos^2\theta_0)] - 2Z/X \sin\theta_0(d_3^2 - d_4^2) - 2d_3 d_4](d_3 + d_4)\cos\theta_0 + X^2(d_3 + d_4)^2 \cos^2\theta_0 = 0. \tag{9}$$

A second parabolic collimator (or mirror) 146 is used to correct the phase curvature as the beam propagates a distance $x_{02}$ from the beam waist after the elliptic minor:

$$x_{02} = s_2 - d_2. \tag{10}$$

The beam radius $w_4$ and the radius of curvature R, after reflection from the second parabolic collimator are given:

$$w_4 = w_3 \sqrt{\left[1 + \left(\frac{x_{R3}}{x_{02}}\right)^2\right]}, \text{ and} \tag{11a}$$

$$R = \frac{1}{\frac{1}{x_{02}\left[1 + \left(\frac{x_{R3}}{x_{02}}\right)^2\right]} - \frac{1}{x_{02}}}. \tag{11b}$$

This curvature is small and good for illuminating a focusing SIM close to the second parabolic collimator.

Figure 8:
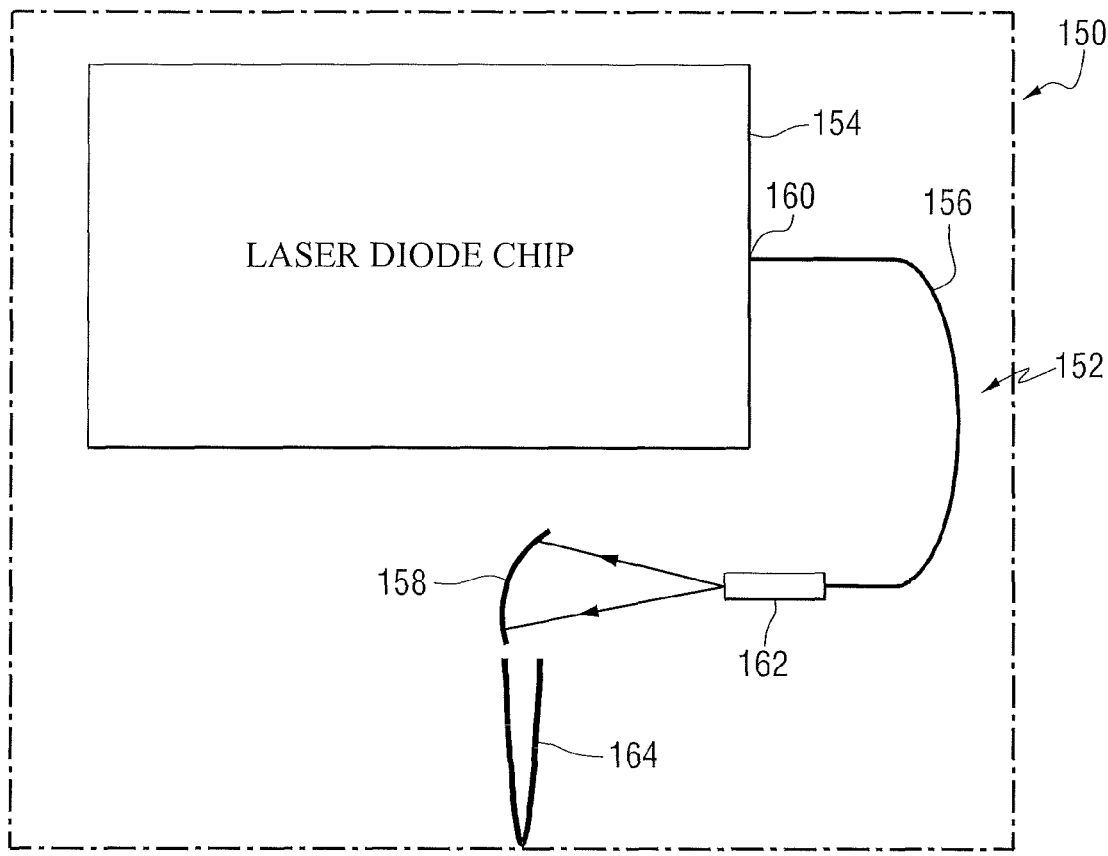
FIG. 8 is a schematic representation of portions of another recording head.

FIG. 8 shows another slider 150 having a laser-in-slider delivery system 152 that includes a laser 154, a channel waveguide 156 and a parabolic collimator or mirror 158, and fits in an existing slider form factor. Light exiting the laser diode is coupled into the waveguide with a tapered waveguide coupler 160, routed by a single-mode channel waveguide with two bends, expanded by a waveguide beam expander 162, collimated by a parabolic collimator 158, and focused by a solid immersion mirror 164.

Figure 9:
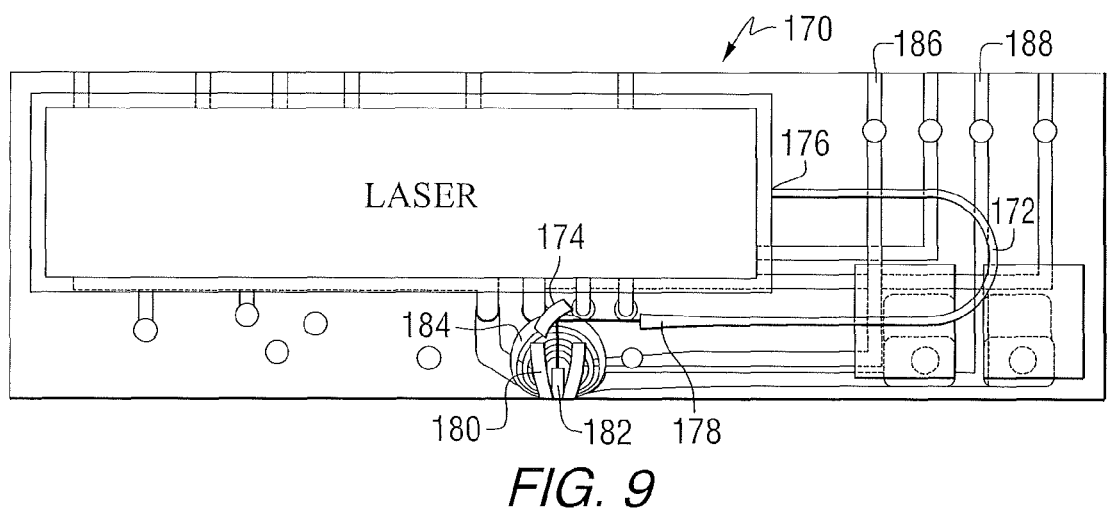
FIG. 9 is an elevation view of another recording head.

FIG. 9 is an elevation view of a recording head 170 that includes a light delivery system similar to that of FIG. 8. The recording head 170 includes a channel waveguide 172 and an off-axis parabolic collimator or mirror 174, and fits in an existing slider form factor. Light exiting the laser diode is coupled into the waveguide with a tapered waveguide coupler 176, routed by a single-mode channel waveguide with two bends, expanded by a waveguide beam expander 178, collimated by an off-axis parabolic collimator 174, and focused by a solid immersion mirror 180. FIG. 9 includes the elements of FIG. 8 and further includes a write pole 182 and coil 184. Electrical connections 186 and 188 are provided to supply electrical current to the coil to induce a magnetic field in the write pole.

The layout of FIGS. 8 and 9 is more compact than that shown in FIGS. 2 and 3. Once again, a beam expander is used to relieve the alignment constraints on the collimator and to reduce the beam asymmetry to a large extent.

In another aspect, the invention provides a method for delivering light to a focal point that can be practiced using the apparatus described above. The method includes: producing a beam of light, coupling light from a laser diode into a slider waveguide, expanding the beam of light to produce an expanded beam, collimating the expanded beam, and concentrating the collimated beam to a focal point.

The above description and examples illustrate the structures of exemplary implementations of apparatus that may be used for light delivery for heat assisted magnetic recording. Although various implementations of the apparatus have been described above with a certain degree of particularity, or with reference to one or more individual implementations, those skilled in the art could make numerous alterations to the disclosed implementations without departing from the spirit or scope of the invention. It is intended that all matter contained in the above description and shown in the accompanying drawings shall be interpreted as illustrative only of particular implementations and not limiting. The implementations described above and other implementations are within the scope of the following claims.

What is claimed is:

1. An apparatus comprising:
a coupler configured to couple light received from a light source into a slider waveguide;
a beam expander configured to expand the beam of light received from the coupler, the beam expander having a shape defined by: $W(x)^2 = W_0^2 + 2\alpha\lambda_g d$, wherein $W(x)$ is a width of the beam expander, d is a distance from the slider waveguide, $W_0$ is a start width of the beam expander, $\lambda_g$ is a mode wavelength of the slider waveguide, and $\alpha$ is a constant;
a parabolic collimating mirror configured to collimate the expanded beam; and
a focusing device configured to concentrate the collimated beam to a focal point.

2. The apparatus of claim 1, wherein an exit facet of the beam expander is positioned at the focus of the parabolic collimating mirror.

3. The apparatus of claim 1, further comprising:
first and second mirrors, wherein the first mirror reflects the collimated beam toward the second mirror and the second mirror reflects the collimated beam toward the focusing device, and wherein the first and second mirrors both comprise straight mirrors or spherical mirrors.

4. The apparatus of claim 1, further comprising an elliptical mirror and a second parabolic collimating mirror, wherein the elliptical mirror reflects the collimated beam toward the parabolic collimating mirror and the second parabolic collimating mirror reflects the collimated beam toward the focusing device.

5. A method comprising:
producing a beam of light;
coupling the light into a slider waveguide;
expanding the beam of light to produce an expanded beam using a beam expander having a shape defined by: $W(x)^2 = W_0^2 + 2\alpha\lambda_g d$, wherein $W(x)$ is a width of the beam expander, d is a distance from the slider waveguide, $W_0$ is a start width of the beam expander, $\lambda_g$ is a mode wavelength of the slider waveguide, and $\alpha$ is a constant;
collimating the expanded beam via a parabolic collimating mirror; and
concentrating the collimated beam to a focal point.

6. The method of claim 5, further comprising:
focusing the light to a near field transducer to heat a spot on a magnetic media.

7. The method of claim 6, wherein the focusing step is accomplished using a solid immersion mirror.

8. The method of claim 5, wherein the beam of light comprises a single mode light beam, the method further comprising using a first mirror to reflect the collimated beam toward a second mirror and using the second mirror to reflect the collimated beam toward a focusing device.

9. An apparatus comprising:
a coupler configured to receive light from a light source and couple the light into a slider waveguide;
a beam expander adjacent to an exit end of the slider waveguide configured to expand the beam of light, the beam expander having a shape defined by: $W(x)^2 = W_0^2 + 2\alpha\lambda_g d$, wherein $W(x)$ is a width of the beam expander, d is a distance from the slider waveguide, $W_0$ is a start width of the beam expander, $\lambda_g$ is a mode wavelength of the slider waveguide, and $\alpha$ is a constant;
a parabolic collimating mirror configured to collimate the expanded beam;
a focusing device configured to concentrate the collimated beam to a focal point; and
a near-field transducer that tunnels the light from the focal point to heat a spot on a magnetic media.

10. The apparatus of claim 9, wherein the coupler comprises a tapered waveguide coupler.

11. The apparatus of claim 9, wherein the slider waveguide comprises a single-mode channel waveguide.

12. The apparatus of claim 1, wherein the collimating mirror comprises:
an off-axis parabolic collimator.

13. The apparatus of claim 1, wherein the beam expander reduces a maximum angle of the expanded beam received at the parabolic collimator, and wherein the reduction in maximum angle reduces asymmetry of the collimated beam.

14. The apparatus of claim 1, wherein the beam expander reduces a maximum angle of the expanded beam received at the parabolic collimator, and wherein the reduction in maximum angle reduces divergence of the collimated beam.

15. The apparatus of claim 1, wherein the beam expander reduces a maximum angle of the expanded beam received at the parabolic collimator, and wherein the reduction in maximum angle eases constraints on positioning tolerances of the parabolic collimator.

16. The apparatus of claim 1, wherein the beam expander comprises walls having a parabolic shape.

17. The apparatus of claim 1, wherein the apparatus is a heat-assisted magnetic recording head.

18. The apparatus of claim 9, wherein the beam expander comprises walls having a parabolic shape.

* * * * *